United States Patent Office 3,471,314
Patented Oct. 7, 1969

3,471,314
PYROLYTIC CARBON COATING PROCESS
Ronald L. Beatty, Oak Ridge, and Dale V. Kiplinger, Concord, Tenn., assignors to the United States of America as represented by the United States Atomic Energy Commission
No Drawing. Filed Dec. 13, 1966, Ser. No. 601,826
Int. Cl. C23c 9/06, 13/04; B44c 1/02
U.S. Cl. 117—46    5 Claims

ABSTRACT OF THE DISCLOSURE

This invention relates to a process for preparing particles having a high density, isotropic pyrolytic carbon coating by contacting the particles in a fluidized bed with a coating gas selected from the group consisting of propane, 1,3 butadiene and propylene at a temperature between 1100°–1300° C.

Cross-references to related applications

S.N. 538,923, filed on Mar. 29, 1966, in the names of Hans Beutler et al., for "Method for Applying Low Density Carbon Coatings."
S.N. 546,490, filed on Apr. 28, 1966, in the names of Ronald L. Beatty et al., for "Method for Preparing Actinide Oxide Fuel Particles and Article Thereof," and now Patent Number 3,301,763.

Background of the invention

This invention described herein was made in the course of, or under, a contract with the U.S. Atomic Energy Commission. It relates generally to coated fuel particles and more particularly to a method for preparing fuel particles having a high density, isotropic pyrolytic carbon coating.

Extensive investigation has been conducted on various types of coatings for nuclear fuel particles. It is generally agreed that pyrolytic carbon is a highly suitable coating material and is preferred as a coating for carbide and oxide fuel particles. Moreover, it has further been agreed that in order to insure integrity of the fuel particle, multi-layers of coating material should be employed. In one application it has been found that by providing a highly porous, low density carbon coating followed by an outer impervious coating of high density pyrolytic carbon, fuel failure under irradiation, due to fission product recoil damage and rupture of the coating from thermal stresses and internal pressure build-up from fission product gases, can be greatly minimized. The low density coatings can be applied using acetylene gas at temperatures of about 1000° C. to 1200° C. A more complete description of this method for depositing a low density, porous carbon coating as an initial coating may be found in copending application S.N. 538,923 filed on Mar. 29, 1966, in the names of Hans Beutler et al., for "Method for Applying Low Density Carbon Coatings."

Experimentation with pyrolytic carbon coatings indicated that in order to serve as an impervious outer coating it must be isotropic, i.e., have the same properties in all directions so that strains will not be induced into the coating by thermal effects or by radiation damage, and have high density. While methane has been used to deposit pyrolytic carbon at various temperatures ranging from 1300° C. to above 2000° C., depositions at the lower temperatures resulted in anisotropic deposits; and only at temperatures above 2000° C. were high density, isotropic coatings achieved which were satisfactory as the outer impervious carbon coating.

Unfortunately, all types of fuel particles cannot be coated with this high density, isotropic pyrolytic carbon coating at such high temperatures. Oxide fuel particles when coated, either bare or with a first highly porous, low density carbon coating, with pyrolytic carbon by decomposition of methane at a temperature above 2000° C. undergo a deleterious reaction with the coating during the high temperature deposition. Previously, it has been necessary to provide a thin, high density, sealer coating of carbon over the initial highly porous, low density carbon coating before making the final high temperature deposition to prevent reaction between the oxide core and coating. This method is disclosed in copending application S.N. 546,490 filed on Apr. 28, 1966, in the names of Ronald L. Beatty et al., for "Method for Preparing Actinide Oxide Fuel Particles and Article Thereof." It has been shown that the release of fission products of coated particles during irradiation depends to a large degree on the fuel contamination level of the coating. It is well known that fuel migration during the application of the coating is mainly responsible for this contamination. Fuel migration particularly in case of carbide fuels is strongly temperature dependent and is insignificant below 1500° C. Therefore a low temperature coating process enables the application of very clean coatings resulting in low fission gas release rates. It is therefore highly desirable to provide a method for coating all types of nuclear fuel particles with a high density, isotropic pyrolytic carbon coating at relatively low temperatures without resort to additional coating operations, as well as to effect such coating operation without necessitating a transfer of particles from a low temperature coating furnace to a high temperature furnace in a single coating run, which has been required in the prior art method.

Summary of the invention

The object of the invention, which is to provide a process for applying high density, isotropic pyrolytic carbon coatings to nuclear fuel particles at low temperatures, is achieved by contacting a bed of fluidizing nuclear fuel particles with a coating gas selected from the group consisting of propane, 1,3 butadiene and propylene at a temperature within the range of 1100° C. to 1300° C. Applicants have found that isotropic pyrolytic carbon coatings of high density, i.e., within the range of 1.95 to 2.1 gm./cc., could be obtained employing propane, 1,3 butadiene or propylene as the coating gas within a critical temperature range which is markedly lower than those employed in prior art processes. Moreover, deposition is rapid requiring only about one-fifth the time required in the prior art. Additionally, the temperature drop within the reaction zone upon initiation of the deposition operation was significantly lower than in prior art processes which beneficially afforded a high degree of control over the coating operation. The process is highly useful in the preparation of coated particles which are suitable for use in nuclear reactors.

Description

It should be apparent that the present invention is applicable to coating any of the nuclear fuels such as thorium carbide, thorium oxide, uranium oxide, carbide, uranium nitride, plutonium carbide, plutonium oxide, plutonium nitride, etc., and mixtures thereof. By the term "particles" it is intended to refer to spheroids of the selected fuel material having an average particle diameter from 1–1000 microns, preferably from 260–500 microns.

In carrying out the invention, the fuel particles, such as thorium oxide particles, are charged into a fluidized bed reactor. As a preliminary step the particles may be coated with an initial low density, porous carbon coating as disclosed in S.N. 538,923 cited hereinbefore. For this undiluted acetylene may be used as the coating and fluidizing gas with the deposition being carried out at an initial temperature of 1050° C. It will be apparent here that the invention is not to be construed as limited to preparation of multi-layer carbon coated fuel particles but rather has application to any process for preparing fuel particles in which the outer layer is a high density, isotropic pyrolytic carbon coating whether it be as a single or multiple layer coating.

After the low density, porous carbon coating is deposited to a desired thickness such as about 50 microns, this coating phase is terminated by substitution of helium for the acetylene and the reactor temperature equilibrated to a temperature within the range of 1110° to 1300° C. The coating and fluidizing gas comprising propane, 1,3 butadiene or propylene, in accordance with this invention, is then substituted for the helium gas to initiate deposition, of the isotropic, high density pyrolytic carbon coating. The temperature at which the deposition is carried out is critical. As the temperature goes down (i.e., from about 1250° C.) the deposition rate (and efficiency) of the coating process is reduced and the anisotropy factor is increased. Hence, when temperatures below 1100° C. are employed high densities of about 2.0 gm./cc. can be achieved, but with an increase in anisotropy factors. At temperatures above 1300° C. the density of the pyrolytic carbon coatings drops off. Accordingly, temperatures between 1100°–1300° C. are required for the preparation of high density, isotropic pyrolytic carbon coatings.

The coating operation may be effected by providing the coating gas either undiluted or as a mixture with an inert fluidizing gas, such as helium. The supply rates for the coating gas are, preferably, between 1–4 cm.$^3$/min.-cm.$^2$ of particle surface area. Within this range of supply rates the proportion of the coating gas, when diluted with helium, is not critical, and suitable coating runs have been obtained employing a total flow rate of 4 liters/minute with ratios for diluted runs of 1:3 to 3:1 coating gas to helium. As expected, the highest deposition rates were obtained with undiluted coating gas at 4 liters/minute flow rate.

Where 1,3 butadiene or propylene is employed as the coating gas, additional advantages are afforded. Characteristically, thermal cracking of hydrocarbon gases which crack endothermically produces large temperature drops (up to 300° C.) upon initiation of the coating operation. With propane, which cracks endothermically (24.8 kg.-cal./mole), the reactor zone temperature dropped about 150° C. upon initiation of the coating operation. To compensate for this, reactor is initially heated to temperature which is slightly higher than that at which the coating is to be carried out. Where 1,3 butadiene or propylene is employed, however, the temperature drop has been found to be significantly lower (about 50° C.), thereby beneficially affording a closer control over the temperature at which the deposition is conducted. The advantages afforded by effecting a deposition at an essentially constant deposition temperature throughout the coating operation will be readily appreciated by those skilled in the art.

Having described the invention in a general fashion the following examples are given to indicate with greater particularity the process parameters and techniques. Example I demonstrates the coating of thorium oxide spherical particles with a high density, isotropic pyrolytic carbon coating utilizing propane as the coating and fluidizing gas. Examples II and III illustrate coating of thorium-uranium oxide particles with a high density, isotropic pyrolytic carbon coating employing 1,3 butadiene and propylene, respectively, as the coating and fluidizing gas. Preliminary irradiation data of thorium-uranium oxide particles, which were coated with an initial thin layer of low density, porous carbon coating followed by a high density, isotropic outer coating are also given in Example III.

Example I

Fluidizing bed apparatus, consisting of a 1″ ID graphite reaction chamber having a 36° included angle cone at the bottom with a water-cooled injector, was used for preparing high density, isotropic pyrolytic carbon coated thorium oxide particles employing propane gas as the coating and fluidizing gas at various temperatures and supply rates.

Several coating runs were made employing 28-gram charges of 460 micron diameter thorium oxide particles, respectively. The particles were placed in the reactor which was preheated to a deposition temperature and fluidized with helium at a flow rate of 4.0 liters/minute until an equilibrium temperature within the range of 1150°–1300° C. was reached. Then the helium flow was switched to undiluted propane gas, which was passed into the reactor to initiate the deposition of an isotropic, high density pyrolytic carbon coating. This deposition was carried out at flow rates between 1–4 cm.$^3$/min.–cm.$^2$ and at propane partial pressures between 190–760 mm. Hg. The coating phase was continued until about a 60-micron thick layer of pyrolytic carbon was deposited, which required about eight minutes, and the deposition terminated.

A sample of the coated particles was removed from the reactor and the coating densities determined. The coating densities were determined as follows: the densities of the coated particles were measured using a helium densitometer. The coatings were then removed by passing oxygen over the particles at 1000° C. and the evolved $CO_2$ gas adsorbed on Ascarite (NaOH on asbestos) and weighed which gives the weight of the coatings. Assuming theoretical density (10.0 grams/cc.) for the thoria particles, the coating densities were then calculated.

Anisotropy measurements were made using graphite disks (⁵⁄₁₆″ diameter by ³⁄₆₄″ thick) which were provided in each run along with the charge of particles. The technique was similar to that used by Bokros (Carbon, vol. 3, pp. 167–74, 1965) and was a modification of Bacon's monochromatic pinhole technique (J. Applied Chem. [London], vol. 6, pp. 477–81, November 1956).

For comparison purposes a run was made using methane at a deposition temperature of 2000° C. which is illustrative of the prior method for obtaining high density, isotropic pyrolytic carbon coatings. The results are shown in Table I below.

TABLE I

| Run | Coating temp. (° C.) | Supply rate (cm.$^3$/min.-cm.$^2$) | Partial pressure (mm. Hg) | Coating Thickness ($\mu$) | Density (g./cm.$^3$) | Anisotropy |
|---|---|---|---|---|---|---|
| 1 | 1,150 | 1.0 | 190 | 64.5 | 2.07 | 1.1. |
|   | 1,200 | 1.0 | 190 | 66.4 | 2.05 | Isotropic. |
|   | 1,250 | 1.0 | 190 | 66.4 | 2.04 | Do. |
|   | 1,300 | 1.0 | 190 | 58.7 | 1.96 | Do. |
| 2 | 1,150 | 2.0 | 380 | 66.2 | 2.04 | Do. |
|   | 1,200 | 2.0 | 380 | 56.4 | 2.10 | Do. |
|   | 1,250 | 2.0 | 380 | 61.2 | 2.05 | Do. |
|   | 1,300 | 2.0 | 380 | 60.1 | 1.96 | Do. |
| 3 | 1,150 | 4.0 | 760 | 65.1 | 2.07 | Do. |
|   | 1,200 | 4.0 | 760 | 63.5 | 2.05 | Do. |
|   | 1,250 | 4.0 | 760 | 47.6 | 2.02 | Do. |
|   | 1,300 | 4.0 | 760 | 65 | 1.96 | Do. |
| 4 | 2,000 | 2.0 | 190 | 60 | 1.90 | Do. |

From the results it may be seen that the coatings deposited over the range of temperatures of 1150°–1300° C. were isotropic (i.e., having an anisotropy factor of about 1.0). Coatings deposited at 1150° C. and propane supply rate of 1.0 cm.$^3$/min.-cm.$^2$ indicated a slight anisotropic character which is indicative of a general trend of increased anisotropy factors as the temperature and propane supply rate are lowered.

Example II

Several 28-gram batches of 250–300 micron diameter spherical thorium-uranium oxide particles were coated employing the same apparatus and techniques used in Example I, except undiluted 1,3 butadiene gas was substituted for propane. The supply rate of 1,3 butadiene was 4 cm.$^3$/min.-cm.$^2$ and a system pressure of one atmosphere pressure was employed. The equilibrium coating temperature, which varied between 1100°–1300° C., was found to be about 40 degrees lower than the intial coater temperature before deposition was initiated. This equilibrium temperature, however, was easily maintained throughout the remainder of the coating run. The coatings were all isotropic and had densities of around 2.0 g./cm.$^3$. The results are shown in Table II below.

TABLE II

| Run | Coating temp. (° C.) | Supply rate (cm.$^3$/min.-cm.$^2$) | Partial pressure (mm. Hg) | Coating Thickness ($\mu$) | Density (g./cm.$^3$) | Anisotropy |
|---|---|---|---|---|---|---|
| 1 | 1,100 | 4.0 | 760 | 50.6 | 2.01 | Isotropic. |
| 2 | 1,150 | 4.0 | 760 | 47.5 | 1.95 | Do. |
| 3 | 1,200 | 4.0 | 760 | 67.2 | 1.99 | Do. |
| 4 | 1,250 | 4.0 | 760 | 65.4 | 1.99 | Do. |
| 5 | 1,300 | 4.0 | 760 | 58.1 | 2.07 | Do. |

Example III

Several 28-gram batches of 250–300 micron diameter spherical thorium-uranium oxide particles were coated employing the same apparatus and techniques used in Example I, except undiluted propylene gas was substituted for propane. The supply rate of propylene was 4.0 cm.$^3$/min.-cm.$^2$ and a system pressure of one atmosphere was employed. The equilibrium coating temperature, which varied from 1150° to 1300° C., was found to be about 40 degrees lower than the initial coater temperature before deposition was initiated. This equilibrium temperature, however, was easily maintained throughout the remainder of the coating run. The results are shown in Table III below.

TABLE III

| Run | Coating temp. (° C.) | Supply rate (cm.$^3$/min.-cm.$^2$) | Partial pressure (mm. Hg) | Coating Thickness ($\mu$) | Density (g./cm.$^3$) | Anisotropy |
|---|---|---|---|---|---|---|
| 1 | 1,150 | 4.0 | 760 | 78.3 | 2.02 | Isotropic. |
| 2 | 1,200 | 4.0 | 760 | 64.0 | 2.01 | Do. |
| 3 | 1,250 | 4.0 | 760 | 48.5 | 2.05 | Do. |
| 4 | 1,300 | 4.0 | 760 | 60.2 | 2.00 | Do. |

For irradiation studies a batch of 250–300 micron diameter spherical thorium-uranium oxide particles were initially coated with a low density porous carbon coating and then with an isotropic, high density outer pyrolytic carbon coating. The particles were fluidized with helium and brought to an equilibrium temperature of 1050° C. Then the helium flow was switched to undiluted acetylene gas, which was passed into the reactor to initiate the deposition of the low density porous carbon coating, and the coating conducted at a flow rate of 4 cm.$^3$/min.-cm.$^2$ with a gas pressure of 760 torr for about 1.5 minutes until a first coating of about 40 microns was deposited. At this stage helium was substituted for the acetylene gas and the reactor temperature equilibrated to a temperature of 1200° C. for deposition of the isotropic high density coating using undiluted propylene gas as the coating and fluidizing gas as hereinbefore described. The coated particles were placed in the ORR Reactor and irradiated at a thermal neutron flux of $5 \times 10^{13}$ to a 3.6 at. percent uranium burnup at 1400° C. Preliminary data of fission gas release rates, which have remained nearly constant during the irradiation, indicate the coatings are of exceptional quality. The average fractional release for 88 Kr is $3.5 \times 10^{-8}$ which is an extremely small release rate.

The above examples are merely illustrative and are not to be understood as limiting the scope of the invention.

What is claimed is:

1. A method for preparing nuclear fuel particles having a high density, isotropic pyrolytic carbon coating thereon comprising the steps of contacting a bed of fluidized fuel particles with a coating gas selected from the group consisting of propane, 1,3 butadiene and propylene at a temperature in the range of 1100° to 1300° C.

2. The method of claim 1 wherein said coating operation is conducted at a flow rate of 1.0–4.0 cm.$^3$/min.-cm.$^2$.

3. The method of claim 1 wherein said coating operation is conducted at 1200° C. with propane at a flow rate of 4 cm.$^3$/min.-cm.$^2$ and at a pressure of 1 atmosphere.

4. The method of claim 1 wherein said coating operation is conducted at 1200° C. with 1,3 butadiene at a flow rate of 4 cm.$^3$/min.-cm.$^2$ and at a pressure of 1 atmosphere.

5. The method of claim 1 wherein said coating operation is conducted at 1200° C. with propylene at a flow rate of 4 cm.$^3$/min.-cm.$^2$ and at a pressure of 1 atmosphere.

References Cited

UNITED STATES PATENTS

| 1,893,286 | 1/1933 | Iredell | 117—106 X |
| 2,414,625 | 1/1947 | Abrams et al. | 117—46 X |
| 3,231,408 | 1/1966 | Huddle | 117—100 X |
| 3,247,008 | 4/1966 | Finicle | 117—100 X |
| 3,249,509 | 5/1966 | Blocher | 117—100 |
| 3,325,363 | 6/1967 | Goeddel et al. | 117—100 X |
| 3,335,063 | 8/1967 | Goeddel et al. | 176—76 |

WILLIAM D. HART, Primary Examiner
MATHEW R. PERRONE, Assistant Examiner

U.S. Cl. X.R.

117—100, 106; 176—67, 91; 264—.5